(12) United States Patent
Key et al.

(10) Patent No.: US 7,225,267 B2
(45) Date of Patent: May 29, 2007

(54) REACTIVE BANDWIDTH CONTROL FOR STREAMING DATA

(75) Inventors: Peter B. Key, Cambridge (GB); Dinan S. Gunawardena, Cambridge (GB); Laurent Massoulie, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 10/351,800

(22) Filed: Jan. 27, 2003

(65) Prior Publication Data

US 2004/0148423 A1    Jul. 29, 2004

(51) Int. Cl.
G06F 15/16    (2006.01)

(52) U.S. Cl. ............... 709/235; 709/223; 709/226; 709/234

(58) Field of Classification Search ............... 709/223, 709/226, 234, 235
See application file for complete search history.

(56) References Cited

U.S. PATENT DOCUMENTS

| | | | |
|---|---|---|---|
| 6,424,624 B1 * | 7/2002 | Galand et al. | 370/231 |
| 6,622,172 B1 * | 9/2003 | Tam | 709/232 |
| 6,671,724 B1 * | 12/2003 | Pandya et al. | 709/226 |
| 6,839,768 B2 * | 1/2005 | Ma et al. | 709/235 |
| 7,058,723 B2 * | 6/2006 | Wilson | 709/235 |
| 7,072,968 B2 * | 7/2006 | Mikami et al. | 709/229 |

FOREIGN PATENT DOCUMENTS

| | | |
|---|---|---|
| EP | 0 448 073 B1 | 9/1991 |
| WO | WO 02/07381 A | 1/2002 |

OTHER PUBLICATIONS

European Patent Office, "European Search Report" for European Patent Application No. 03 029 084.5, Jun. 30, 2006, The Hague.
N. Tokura et al., "Congestion Avoidance Networks: CEFLAR—Congestion Estimation Feedback by Limited Acceleration-Rate/-Ratio", IEEE International Conference on Serving Humanity Through Communications, May 1, 1994, pp. 75-69.
Li Lei et al., "An Adaptive Model of RED/ECN Parameters", International Conference on Communication Technology Proceedings, Aug. 21, 2000, pp. 707-711.

* cited by examiner

*Primary Examiner*—Ario Etienne
*Assistant Examiner*—Avi Gold

(57) ABSTRACT

Real time communications over a network are adjusted to improve the quality of service (QoS) under incipient congestion conditions. The system detects incipient network congestion and feeds back information regarding the incipient congestion back to the transmitter. Based on this information, the transmission rate is altered appropriately using a control algorithm, which computes the altered transmission rate based on a weight parameter, a gain parameter, and information from a congestion report. The altered transmission rate improves the transmitter's use of the available bandwidth to maintain an acceptable QoS at the receiver.

30 Claims, 8 Drawing Sheets

REACTIVE BANDWIDTH CONTROL FOR STREAMING DATA

TECHNICAL FIELD

The invention relates generally to network communications, and more particularly to controlling bandwidth usage in network communications.

BACKGROUND OF THE INVENTION

Many current multimedia applications, such as streaming video and audio players, were originally designed to operate from attached local storage (e.g., CD or hard disk) or over a high-quality low latency network (e.g., a lightly loaded local area network or LAN). However, when running over a lower quality network such as a wide-area network (WAN), packet loss and latency resulting from network congestion often impair the real-time operation of a multimedia application enough to provide a poor user experience, often described as poor Quality of Service (QoS). For example, video frames may be lost, or video and audio synchronization may be corrupted, resulting in poor quality multimedia performance.

To address these issues, some current multimedia applications have been developed to adapt their transmission rates according to network conditions. One approach alters transmission rate in response to the detection of lost packets. Specifically, for real time applications, such as streaming multimedia, a Real Time Protocol (RTP) has been specified with an associated Real Time Control Protocol (RTCP) to monitor QoS and convey participant information based on lost packet detection. Another approach increases the number of packets that are buffered in networking equipment in the hope of avoiding or minimizing data loss. Forward Error Correction may also be employed with these enhanced buffering schemes. Yet another approach estimates the expected bandwidth of "bottleneck" links and attempts to statically set the transmission rate accordingly.

However, these existing approaches are inadequate. Because the first approach relies on detection of lost packets, any attempt to correct the problems is too late to avoid a poor user experience from initial packet loss. The second approach of increasing buffering replaces data loss with increased latency introduced by large send queues. Furthermore, the second approach is problematic for devices having limited buffer memory, such as an audio/visual mobile phone or watch. The third approach fails to address inherently variable bandwidth bottlenecks (such as a wireless link) or dynamic congestion changes introduced by multiple applications sharing the available bandwidth at the bottleneck.

In addition, no existing approach specifically addresses reactive bandwidth control, responsive to incipient congestion for real-time communications, which are commonly employed in multimedia applications.

SUMMARY OF THE INVENTION

Embodiments of the present invention solve the discussed problems by tracking a weighted fair-share of the available network bandwidth using feedback appropriate for elastic-delay-sensitive multimedia. The system detects incipient network congestion and feeds back information to the transmitter that allows the transmitter to adapt to incipient congestion in the network. Incipient congestion refers to congestion that has not yet occurred (e.g., has not yet resulted in lost packets or unacceptable latency). Based on this information, the transmission rate is altered appropriately. A control algorithm computes the altered transmission rate based on a weight parameter, a gain parameter, and information from a congestion report. The altered transmission rate improves the transmitter's use of the available bandwidth to maintain an acceptable QoS at the receiver.

In implementations of the present invention, articles of manufacture are provided as computer program products. One embodiment of a computer program product provides a computer program storage medium readable by a computer system and encoding a computer program that adjusts a resource demand on an available resource by a resource consumer based on an indication of incipient resource congestion detected by an intermediary device. Another embodiment of a computer program product may be provided in a computer data signal embodied in a carrier wave by a computing system and encoding the computer program that adjusts a resource demand on an available resource by a resource consumer based on an indication of incipient resource congestion detected by an intermediary device.

The computer program product encodes a computer program for executing on a computer system a computer process for adjusting a resource demand on an available resource by a resource consumer based on an indication of incipient resource congestion detected by an intermediary device. A weight parameter is determined that relates to a fair share of an available resource associated with the resource consumer. The indication of incipient resource congestion is received. A gain parameter is determined relating to a magnitude of an adjustment in the resource demand by the resource consumer through the intermediary device, based on the indication of the incipient resource congestion. A new resource demand is computed based on the weight parameter and the gain parameter to adjust use by the resource consumer of the available resource.

In another embodiment, a method of adjusting a resource demand on an available resource by a resource consumer based on an indication of incipient resource congestion detected by an intermediary device is provided. A weight parameter is determined that relates to a fair share of an available resource associated with the resource consumer. The indication of incipient resource congestion is received. A gain parameter is determined relating to a magnitude of an adjustment in the resource demand by the resource consumer through the intermediary device, based on the indication of the incipient resource congestion. A new resource demand is computed based on the weight parameter and the gain parameter to adjust use by the resource consumer of the available resource.

In yet another embodiment, a method provides an indication of incipient resource congestion to a transmitter in a network. The indication of incipient resource congestion is based on ECN (Explicit Congestion Notification) marking information provided by an intermediary device in the network. The ECN marking information received from the intermediary device is tracked. The ECN marking information is decoded to generate a congestion report indicating incipient resource congestion, responsive to the tracking operation. The congestion report is communicated to the transmitter.

Another computer program product embodiment provides an indication of incipient resource congestion to a transmitter in a network. The indication of incipient resource congestion is based on ECN marking information provided by an intermediary device in the network. The ECN marking information received from the intermediary device is tracked. The ECN marking information is decoded to generate a congestion report indicating incipient resource congestion, responsive to the tracking operation. The congestion report is communicated to the transmitter.

In yet another embodiment, an end system provides reactive bandwidth control to adjust a resource demand on an available resource by a resource consumer based on an indication of incipient resource congestion detected by an intermediary device. A network transport layer module receives the indication of incipient resource congestion. A WTP module determines a weight parameter relating to a fair share of an available resource associated with the resource consumer. The WTP module also determines a gain parameter relating to a magnitude of an adjustment in the resource demand by the resource consumer through the intermediary device, based on the indication of the incipient resource congestion. The WTP module further computes a new resource demand based on the weight parameter and the gain parameter to adjust use by the resource consumer of the available resource.

In yet another embodiment, an end system provides an indication of incipient resource congestion to a transmitter in a network. The indication of incipient resource congestion is based on ECN marking information provided by an intermediary device in the network. A mark feedback codec decodes the ECN marking information to generate a congestion report indicating incipient resource congestion. A mark tracking module tracks the ECN marking information received from the intermediary device and directs ECN marking information to the mark feedback codec.

These and various other features as well as other advantages, which characterize the present invention, will be apparent from a reading of the following detailed description and a review of the associated drawings.

DETAILED DESCRIPTION OF THE INVENTION

Figure 1:
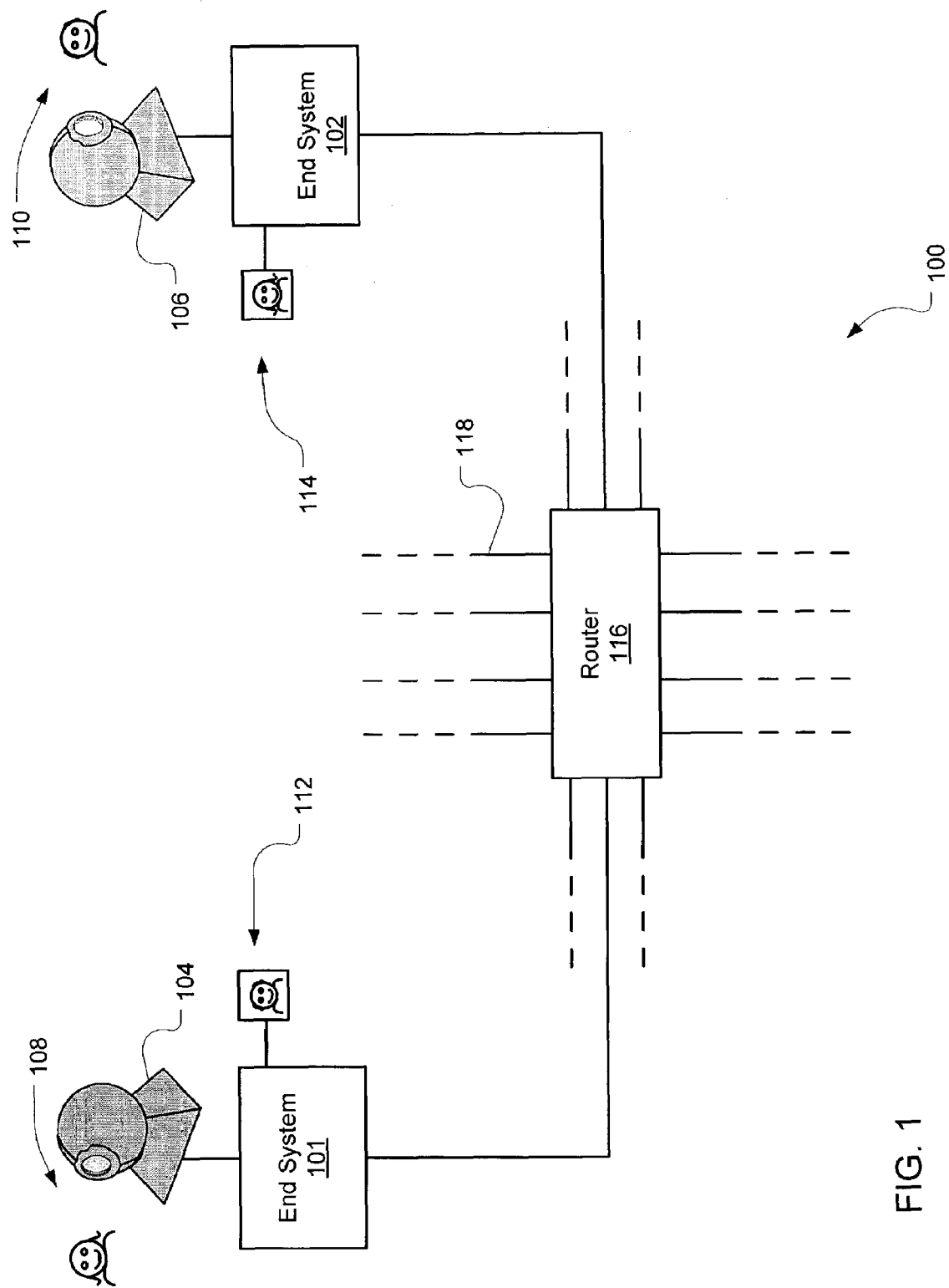
FIG. 1 illustrates an exemplary end to end system view in an embodiment of the present invention.

Real time communications over a network are adjusted to improve the QoS under incipient congestion conditions. The system detects incipient network congestion and feeds back information regarding the incipient congestion back to the transmitter. Based on this information, the transmission rate is altered appropriately using a control algorithm, which computes the altered transmission rate based on a weight parameter, a gain parameter, and information from a congestion report. The altered transmission rate improves the transmitter's use of the available bandwidth to maintain an acceptable QoS at the receiver.

It should also be understood that reactive bandwidth control can be applied to a variety of scenarios, including without limitation control of transmission power in a wireless network, adjustment of processing request in a distributed computing application, and adjustment of storage requests in a storage application. Generally, generic resource usage may be controlled in response to incipient resource congestion (e.g., overload) indications.

Many network communications may be categorized as "real time" or "non-real-time" communications. For example, file transfers, such an HTTP (HyperText Transfer Protocol) response containing an HTML (HyperText Markup Language) document, may be considered non-real-time communications. In many non-real-time applications, the Transmission Control Protocol (TCP) is adequate for controlling communications. TCP is the most common transport layer protocol and is based on the Internet Protocol (IP) as its underlying protocol. As such, TCP/IP means "Transmission Control Protocol over Internet Protocol". TCP is connection-oriented and provides reliable communications over IP packet-switched networks. If network congestion or other communication events result in packet loss, TCP specifies an algorithm for detecting and feeding back information about the packet loss to allow the sender to retransmit the lost packets to the intended receiver. In this manner, TCP targets 100% reliable communications between a sender and a receiver, which is crucial to file transfer applications (e.g., failure to communicate a lost packet may result in reception of a corrupted file).

However, many multimedia applications are real-time streaming media applications, where timely reception of data packets is crucial to acceptable operations of the application. In addition, there is no need for 100% reliability. It is generally preferable to lose a transmitted or substantially delayed packet than to delay the multimedia application in anticipation of the packet's late arrival or retransmission. For example, if a packet of a video stream is lost or significantly delayed during transmission, it is more important to continue streaming subsequent data than to hold up playing the video data so that the receiver can eventually receive the errant packet.

As such, many real-time network communications rely on the User Datagram Protocol (UDP). UDP is a communications protocol for the Internet network layer, transport layer, and session layer. Like TCP, UDP is used with IP. However, unlike TCP, UDP is connection-less and does not guarantee reliable communications. The receiving application is left to process any errors and check for reliable delivery, if necessary.

FIG. 1 illustrates an exemplary end to end system view in an embodiment of the present invention. A WAN 100 is shown, although embodiments of the present invention are applicable to other network types, including LAN. In WANs, bandwidth utilization usually decreases towards the network backbone, where congestion is rare or absent. Generally, bottlenecks are most often found where there is a significant bandwidth disparity between one side of the link and the other. The disparity typically results in excessive packet queuing when the lower bandwidth link is overloaded. Therefore, bottlenecks frequently exist at the access link (e.g., a point in the WAN at which a LAN connects to a relatively uncongested network segment or backbone). For example, DSL (Digital Subscriber Line) connections or small leased lines into corporate intranets are typical bottlenecks.

A first end system 101 is coupled to the network 100, receiving video data of a subject 108 from a camera 104. A display 112 displays a subject 110 from a video data stream received from an end system 102. The second end system 102 is coupled to the network 100, receiving video data of the subject 110 from a camera 106. A display 114 displays a subject 108 from the video data stream received from the end system 101. An exemplary end system may be a general purpose computer or handheld device, although other end systems are contemplated within the scope of the present invention, including communication kiosks, mobile phones, and other special purpose devices. In addition, the network 100 may communicatively link more than two end systems together, and multiple transmitting end systems and receiving end systems may be engaged in a given communication session.

The following portion of the description focuses on the video data stream flowing from the transmitting end system 101 to display the subject 108 on the receiving end system 102. However, it should be understood that an opposite video data stream flows from end system 102 to display the subject 110 on the end system 101, which may also be controlled in accordance with the present invention. It should also be understood that corresponding audio data streams, which may also be controlled in accordance with the present invention, may be communicated between the end systems as counterparts to the video data streams.

On the network 100, between the two end systems 101 and 102, at least one router 116 operates to detect incipient network congestion. The router 116 is an exemplary intermediary network device that detects congestion in the illustrated embodiment. Other exemplary intermediary network devices may include without limitation gateways, firewalls, and proxy servers. The partial lines, such as line 118, indicate that the router 116 may also receive and forward data from other communication flows involving other network devices. All such communication flows may be influencing the congestion experienced by the router 116.

In the illustrated embodiment, the router 116 supports ECN (Explicit Congestion Notification) marking and marks packets for ECN Capable Transport (ECT) data flows. In some embodiments, the ECT data flows are designated on a per IP flow basis. Therefore, a notification protocol exists between a transmitting end system, such as end system 101, and the receiving end system, such as end system 102, in order to identify ECT data flows between end system 101 and end system 102. The transmitting end system 101 may be referred to as a "resource consumer" because its transmitting activity consumes available bandwidth (i.e., a resource) in the network.

In its capacity as a transmitter of a multimedia stream, the transmitting end system 101 announces that it can react to incipient congestion by indicating that it is an ECT device. In response, the receiver end system 102 announces that it is also an ECT device. As such, the receiver end system 102 agrees to feedback ECN information that detects from the incoming video data stream. The agreement enables the end systems to accommodate reactive bandwidth control of the video data stream. Thereafter, the transmitting end system 101 sets an ECT flag on all outgoing IP packets of the session, informing the router 116 that the router 116 may mark packets for the ECT data flow.

In alternative embodiments, all ECN transmissions from the transmitting end system 101 are marked as ECT. In this embodiment, the transmitting end system 101 can react to any congestion reports received. If no congestion reports are ever received, the transmitting end system 101 need not discern whether or not the absence is cause by a lack of congestion or a lack of ECT receivers. No change of behavior is required on the transmitter's part.

In one embodiment, when the router 116 detects incipient congestion, the router 116 marks an IP packet by setting an ECN flag to indicate "Congestion Experienced" (CE). The ECN marking makes use of two reserved bits in the IP header. Two ECN bits are in formerly reserved fields in the old Type of Service byte corresponding to the IPv6 class octet. The byte is now designated as the DiffServ field, where the first six bits form the DS (DiffServ) field and the last two bits are approved for experimental use. These last two bits are used to encode congestion notification: two bits essentially encode 1 bit for congestion information giving a nonce capability that enables certain forms for ECN cheating to be detected (e.g., cheating involving erasure of the congestion notifications). In this embodiment, the encoding is defined as follows, although other specific encodings, including an encoding scheme involving only one bit or more than two bits, would not depart from the scope of the present invention:

1. The transmitting end system 101 sets the ECN bits to (00) to indicate that the transport is not ECN capable.
2. The transmitting end system 101 sets the ECN bits to (01) or (10) to indicate that the transport is ECN capable—"setting the ECT flag". It is possible for the end-system to invoke a specific strategy for the choice of the particular bits (01) or (10). For example:
   a. Always choose (1,0) to allow for other uses for (0,1)
   b. By invoking a pseudo-random algorithm to randomly chose between (1,0) and (0,1) to create a non-capability
3. The router 116 sets the ECN bits to (11) to indicate detection of incipient congestion.

As a packet reaches the output queue of the router 116, the router 116 makes a decision based on its current congestion state to perform one of three potential forwarding actions:

1. Forward the packet unaltered.
2. Forward the packet with the ECN bits changed to (11).
3. Drop the packet.

If the router 116 breaches a congestion indication threshold, the router 116 is deemed to have detected incipient network congestion. While this CE condition exists, the router 116 "marks" IP packets to indicate the CE condition before forwarding each packet on toward its destination. An exemplary ECN capable router includes Cisco IOS release 12.2.8(4) or better. Implementation of detection and marking may involve various techniques, including without limitation a variety of Active Queue Management (AQM), such as Random Early Detection (RED), or a Virtual Queue.

When receiving marked packets, the receiving end system 102 periodically sends feedback to the transmitting end system 101 to indicate that congestion marks have been received. Based on this feedback (e.g., a congestion report), the transmitting end system 101 alters its transmission rate (up or down) in an effort to better optimize the bandwidth usage at the router 116. One goal of this alteration may be to find the highest transmission rate that results in minimal or no packet loss caused by network congestion at the router 116.

Figure 2:
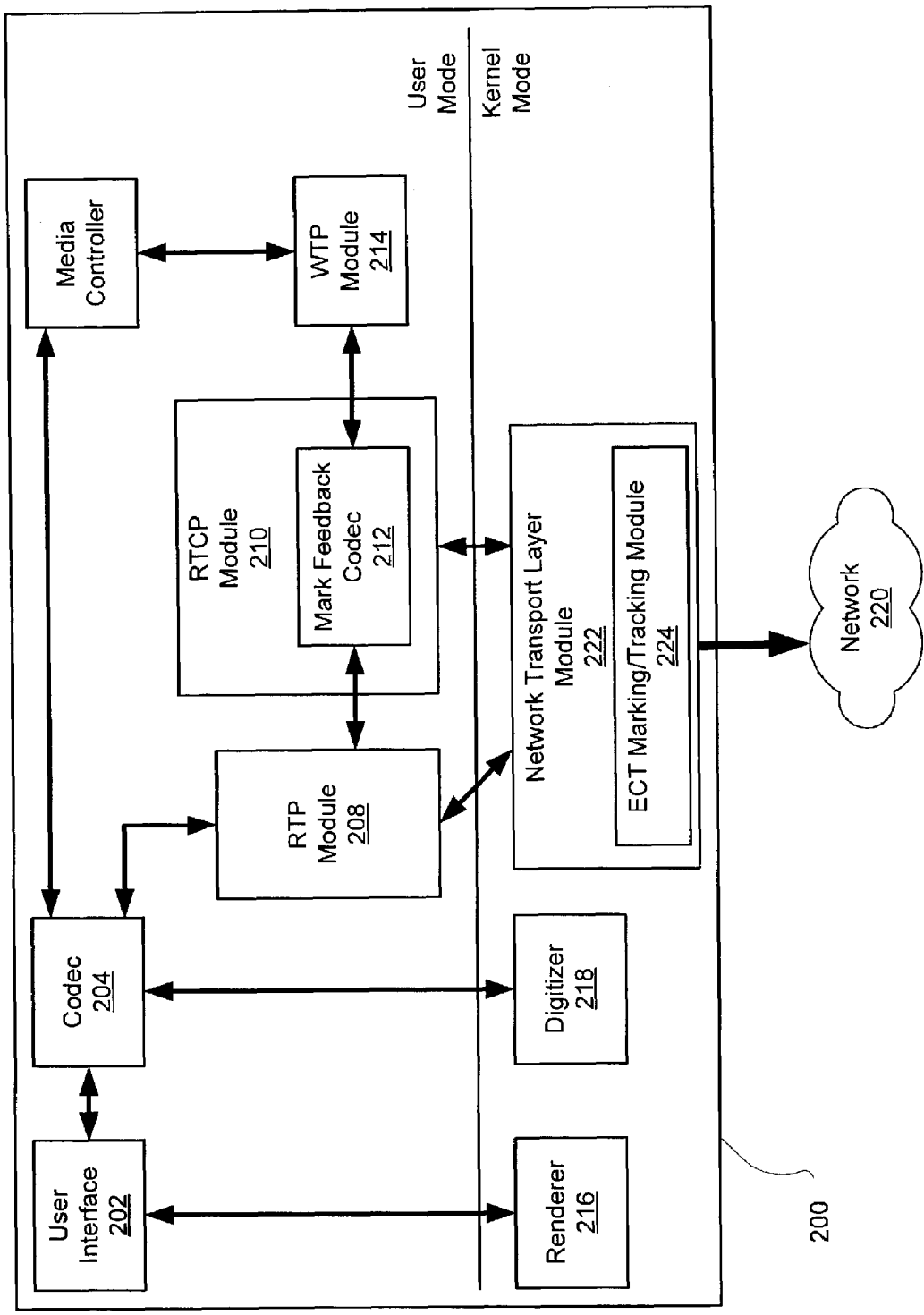
FIG. 2 illustrates an exemplary end system in an embodiment of the present invention.

FIG. 2 illustrates an exemplary end system in an embodiment of the present invention. An end system 200 is coupled through a network 220 to another end system (not shown). At least one network intermediary device (not shown) is logically positioned between the two end systems. The end system includes a renderer 216, which renders multimedia information through the user interface 202, and a digitizer 218, which digitizes analog multimedia information. A multimedia codec 204 receives the digitized multimedia data from the digitizer 218, as well as multimedia data received through the network 220 and the RTP module 208 from another end system. Furthermore, the multimedia codec 204 also sends multimedia data through the RTP module 208 and the network 220 to other end systems.

A network transport layer module 222 includes an marking/mark tracking module 224, which in a transmitting end system marks outgoing IP packets as ECT and in a receiving end system tracks ECN marks detected in incoming IP packets and directs them to a mark feedback codec 212.

An RTCP module 210 includes the mark feedback codec 212 for decoding ECT packets and for encoding a congestion report for transmission back to a transmitting end system. The marking information decoded by the mark feedback codec 212 is received by the WTP module, which estimates the available bandwidth based on the marking information. The estimated available bandwidth value is passed up to the media controller, which takes media specific actions to change the network data load based on the available bandwidth estimate and other heuristics. In the illustrated embodiment, the media controller may adjust the transmission rate through the multimedia codec 204 or the digitizer fidelity through the digitizer 218 to relate the transmission rate to estimated available bandwidth.

The media controller may use a variety of methods to adjust the transmission rate. For example, in one embodiment, the codec may directly alter quantization levels to adjust quality and thereby alter transmission rate. In another embodiment, where some form of layered coding is use, the media controller may add or subtract layers to alter the transmission rate. In other embodiments, to avoid frequent changes to transmission rate, the media controller may only decide to alter the transmission rate once the available bandwidth estimate is sufficiently different from a previous estimate.

Figure 3:
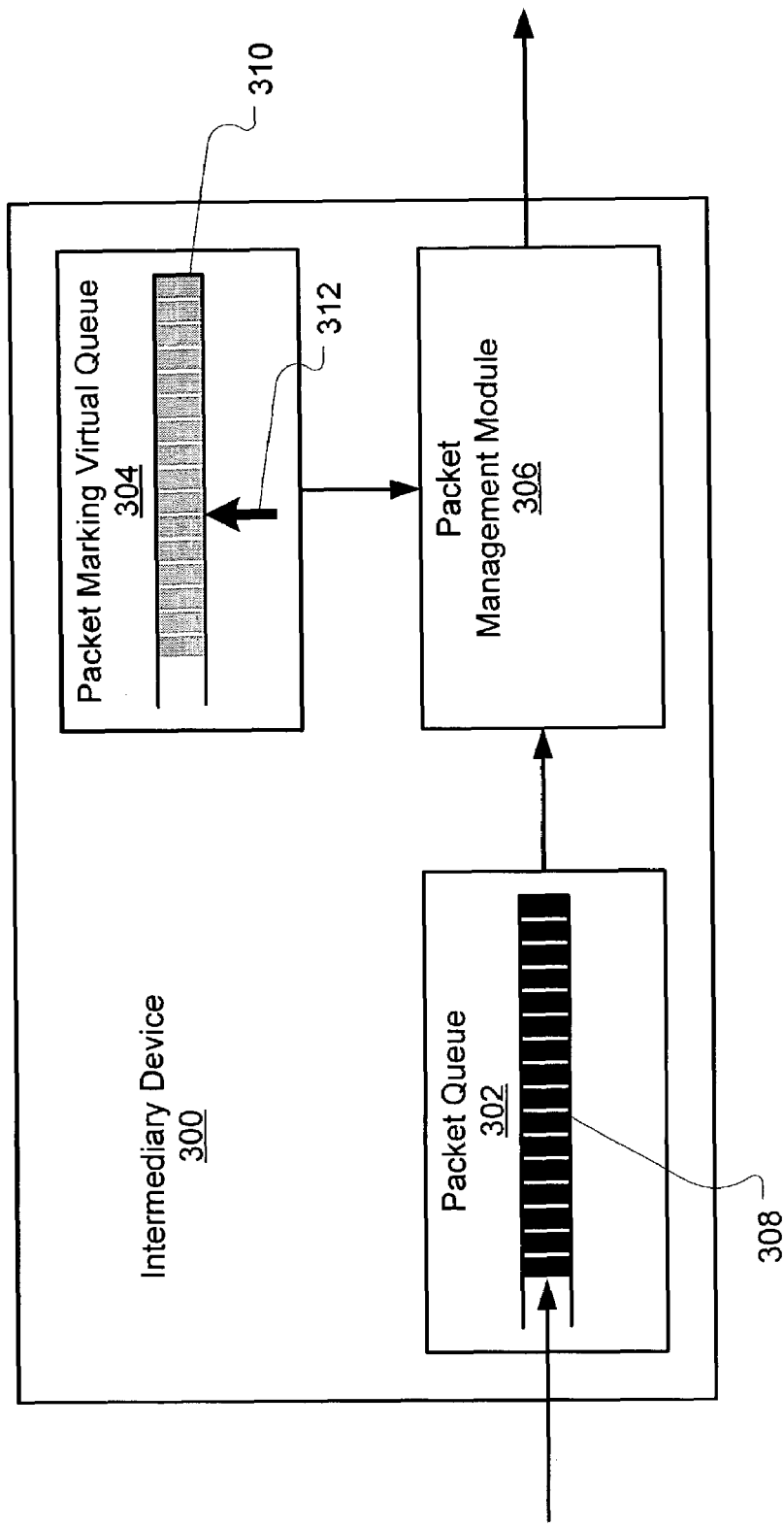
FIG. 3 illustrates an exemplary intermediary device in an embodiment of the present invention.

FIG. 3 illustrates an exemplary intermediary device in an embodiment of the present invention. An intermediary device, such as a router, generally receives incoming ECT packets, marks them if appropriate, and forwards them to a destination system. An intermediary device may also drop a packet if the network congestion warrants it.

An intermediary device 300 includes a physical packet queue 302, such as a queue in memory. Incoming packets 308 are received in the physical packet queue 302. The intermediary device 300 also includes a packet marking virtual queue 304, which tracks the incoming packets in the physical packet queue 302. If the number of packets 310 in the virtual queue 304 exceeds a preset congestion threshold 312, a packet management module 306 marks the packets that are received in excess of the threshold 312 before forwarding them to the destination system. It should also be understood that other marking algorithms may be employed to signal incipient congestion within the scope of the present invention.

Figure 4:
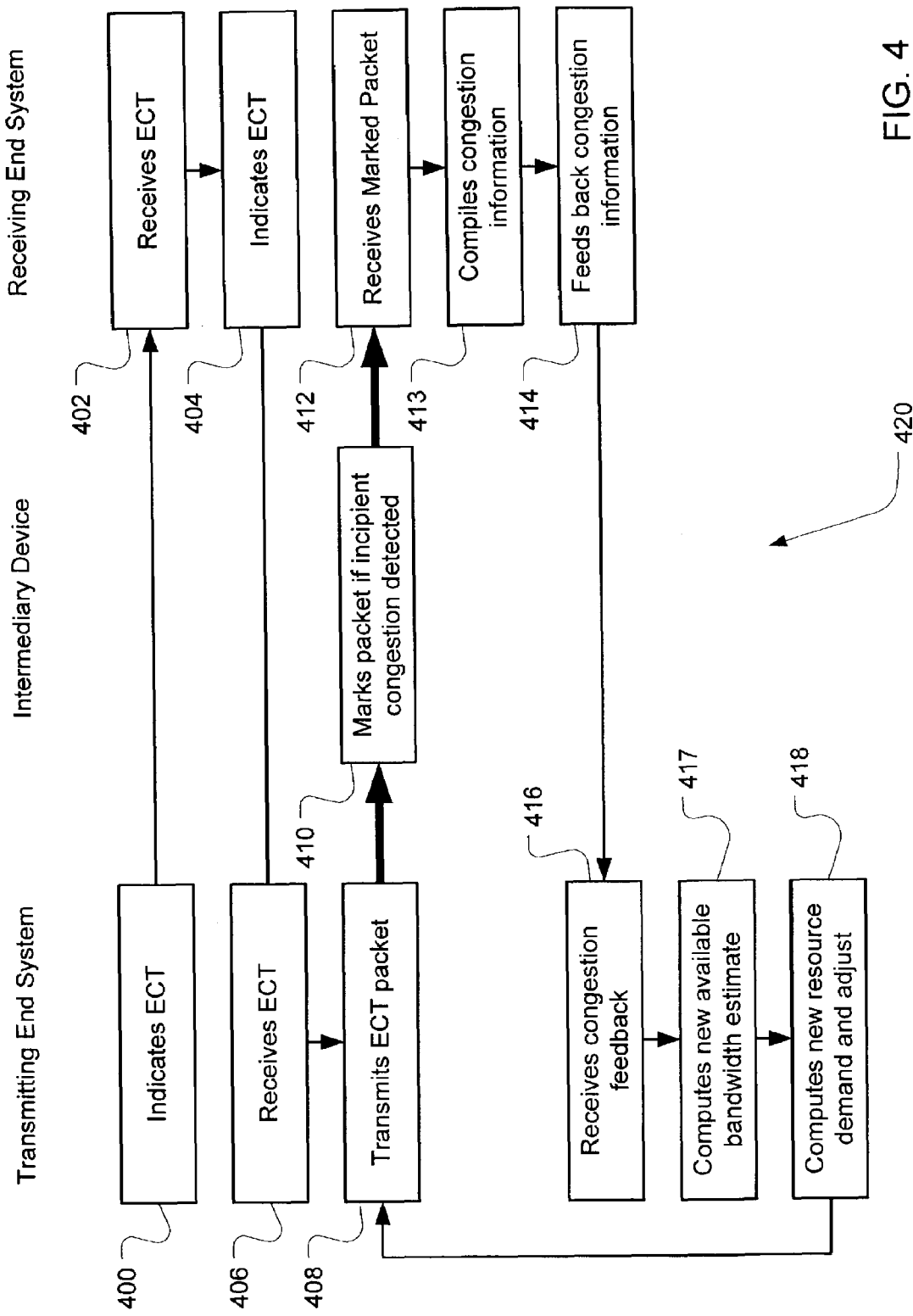
FIG. 4 illustrates messaging and operations among various devices in an embodiment of the present invention.

FIG. 4 illustrates messaging and operations among various devices in an embodiment of the present invention. The messaging is shown in FIG. 4 as being communicated through a system including a Transmitting End System, an Intermediary Device, and a Receiving End System. It should be understood that the Intermediary Device may represent multiple intermediary devices coupled together, including routers, gateways, etc.

In a given RTC session 420, an ECT indication operation 400 advertises to one or more receivers that the transmitting end system is an ECT device. This is done by setting the ECT flag during initial start up as described above, An ECT receiving operation 402 in the receiving end system receives the ECT advertisement from the transmitting end system and responds in an ECT indication operation 404 to notify the transmitting end system that the receiving end system as also an ECT device. This notification is received by the transmitting end system in the ECT receiving operation 406. As previously discussed, an alternative transmitting end system may initially assume that an ECT receiver is in the particular dataflow by omitting operations 400, 402, 404, and 406.

When the transmitting end system receives this signal from the receiving end system in the ECT receiving operation 406, the transmitting end system determines that an ECT data flow has been established with the receiving end system and proceeds with the understanding that the particular IP data flow is an ECT data flow. Thereafter, the transmitting operation 408 transmits one or more ECT packets by setting the ECN bits to (10) or (01) in transmitted IP packets. These ECT packets are transmitted at an initial transmission rate (i.e., a type of "resource demand"). In one embodiment, the initial transmission rate is based on at least one of the following: an initial available bandwidth estimate, user input, and system configurations or policies. Other exemplary resource demands include without limitation could be a demand for power (in say a wireless system), a demand for memory or processing resources, etc. If there are two RTP flows, such as associated audio and video, packets in each flow are marked in this fashion. In some embodiments, RTCP bandwidth usage may be managed by RTC so it is appropriate to allow the RTCP control flow to be marked as "ECN aware".

If the Intermediary Device detects incipient resource congestion, it marks the ECT packet to indicate "Congestion Experienced" and forwards the packet to the receiving end system in a marking operation 410. The receiving end system receives the marked packet in a receiving operation 412. The receiving end system generates a congestion report from the marked packet information in a compilation operation 413. In a feedback operation 414, the receiving end system sends the congestion report back to the transmitting end system. The operations 408, 410, and 412 may occur multiple times before the feedback operation 414 occurs (i.e., information from multiple marked packets may be incorporated into the congestion report before it is transmitted to the transmitting end system). The potential (and likely) multiplicity of the ECT communications between the end systems in these operations is indicated by the wider arrows in that data flow. In addition, in various embodiments, the compilation operation 413 may occur with each market packet receipt or at various intervals.

The receiving end system sends a congestion report back to the transmitting end system via the RTCP control channel. In one embodiment, a congestion report takes the following form.

| Field Name | Storage Size | Description |
| --- | --- | --- |
| SSRC | DWORD | Synchronization Source (SSRC) identifier of RTP flow associated with the IP flow for which congestion is being reported |
| APP_EXT_Name | DWORD | 0x45434e52 'E"C"N"R' |
| Id_num | DWORD | A sequence number for the congestion report. The sequence number increases monotonically with each congestion report sent for this SSRC |
| Marks | DWORD | The number of marked packets seen since the last congestion report. |
| Proto | WORD | The IP protocol number associated with this SSRC. |
| Destport | WORD | The destination (UDP) port associated with the SSRC. |
| MarksBytes | DWORD | The number of bytes received marked since last congestion report. |
| MarksTotalBytes | DWORD | The total number of bytes received marked since start of this SSRC's RTP session. |
| RxBytes | DWORD | The number of bytes received not marked since last congestion report. |
| RxTotalBytes | DWORD | The total number of bytes received not marked since start of the SSRC's RTP session. |

A congestion report is sent whenever a Receiver Report (RR) is generated by the destination RTC session at the receiving end system. This ECN enhancement is robust against changes in the inter RR-interval and is not tied to a fixed inter-RR period, ensuring rapid reporting of increasing bandwidth availability. In an alternative embodiment, the fields Marks, Id_num, Proto, and Destport may be deleted, yielding a realistic overhead of 16 bytes for RTCP Receiver Report.

A receiving operation 416 receives the congestion report, decodes the congestion report (in a mark feedback codec), and passes the received information to a weight-per-mark (WTP) module, which is a bandwidth estimator. The WTP module computes in an estimation operation 417 a new available bandwidth estimate based on an initial estimate, the conditions reported in the congestion report, and various other connection parameters. This new available bandwidth estimate is reported to a media controller module for the associated SSRC, which takes media specific actions to change the resource demand (in the form of an altered transmission rate) based on the new available bandwidth estimate and other heuristics. Although described herein as being computed by the transmitting end system, in alternative embodiments, the new available bandwidth estimate and the new resource demand may be computed by the receiving end system, an intermediate device, or a separate arbiter or congestion manager.

The WTP module implements a WTP algorithm to determine the new available bandwidth estimate in reaction to a congestion report. A transmitting end system (i.e., a traffic source or transmitter) transmits ECT packets at a rate having a fixed average $x_n$ during the $n^{th}$ measurement time interval, where the length of the Measurement Time Interval is MTI. A receiving end system (i.e., a traffic destination or receiver) feeds back to the sender both the sender both the number of the marked packets $m_n$, and the number of sent packets $s_n$ during that interval. The ratio of the two, which may be derived from the congestion report information, represents the corresponding mark probability estimate ($p_n$):

$$p_n = \frac{m_n}{s_n}$$

In one embodiment, a virtual queue marking algorithm is employed. A virtual queue with capacity smaller than the actual capacity of the resource is simulated. Any incoming packet that finds at least B packets waiting in the virtual queue is marked. An exemplary value of B is 10, although other values of B are contemplated within the scope of the present invention.

The altered transmission rate is determined by a control algorithm that uses a weight parameter w and a gain parameter k to adjust the transmission rate, with feedback occasionally sent back from the receiver in a congestion report. In one embodiment, the weight parameter w (also referred to as the WTP parameter) is associated with the transmitting end system and reflects a target transmission rate that would be achieved based on the expected marking probability, $p_{expected}$:

$$w = x_{target} \frac{p_{expected}}{1 - p_{expected}}$$

As such, the weight parameter represents a weighted fair share of the available bandwidth expected by the transmitting end system. Alternatively, the weighting parameter is as follows: it may be determined by setting $x_{target}$ to mimic a rate expected by a given number (N) of TCP connections. Three possible scenarios are described below, where MSS represents a Maximum Segment Size for TCP in bytes, as defined in the IETF RFC 879, which is the IP maximum datagram size minus 40. This MSS parameter can be set as a TCP option, and hence MSS can relate to the MSS for a TCP connection between the sender and the receiver. The default value of MSS, if not set in the TCP options, is 536.

1. For a LAN: w=1500N*MSS. Therefore, if N=4, w=6000*MSS.
2. For a WAN: w=150N*MSS. Therefore, if N=4, w=600*MSS.
3. An adaptive w:

$$w = \frac{1.5}{RTT} * N * MSS.$$

Therefore, if N=4, $$w = \frac{6}{RTT} MSS.$$

The weight parameter may be set by policy on a per-application or per-system basis. It may also be influenced by other operational parameters, including user input.

Based on this weight parameter, a new transmission rate $x_{n+1}$ may be computed as:

$$x_{x+1} = x_n + kx_n\left[1 - p_n - p_n \frac{x_n}{w}\right]$$

The algorithm above provides a locally stable new transmission rate in the neighborhood of the target rate, if the gain parameter k satisfies two conditions:

Condition 1: $k \leq \frac{1}{B+1}$

Condition 2: $k \leq \frac{r}{B}$ where r is the ratio of the Measurement Time Interval (MTI) duration to the Round Trip Time (RTT) duration. Therefore, an acceptable value of k may be computed as:

$$k = \text{Min}\left(\frac{1}{B+1}, \frac{MTI}{B*RTT}\right)$$

The gain parameter influences the magnitude of the adjustment in the resource demand (i.e., the transmission rate) by the transmitting end system through the intermediary device, based on the indication of the incipient resource congestion. For smaller transmission rates, a better new transmission rate may be achieved by taking the maximum of the value of $x_{n+1}$ returned by the equation above and a predefined minimum rate. This limitation precludes the return of nonpositive new transmission rates.

Figure 5:
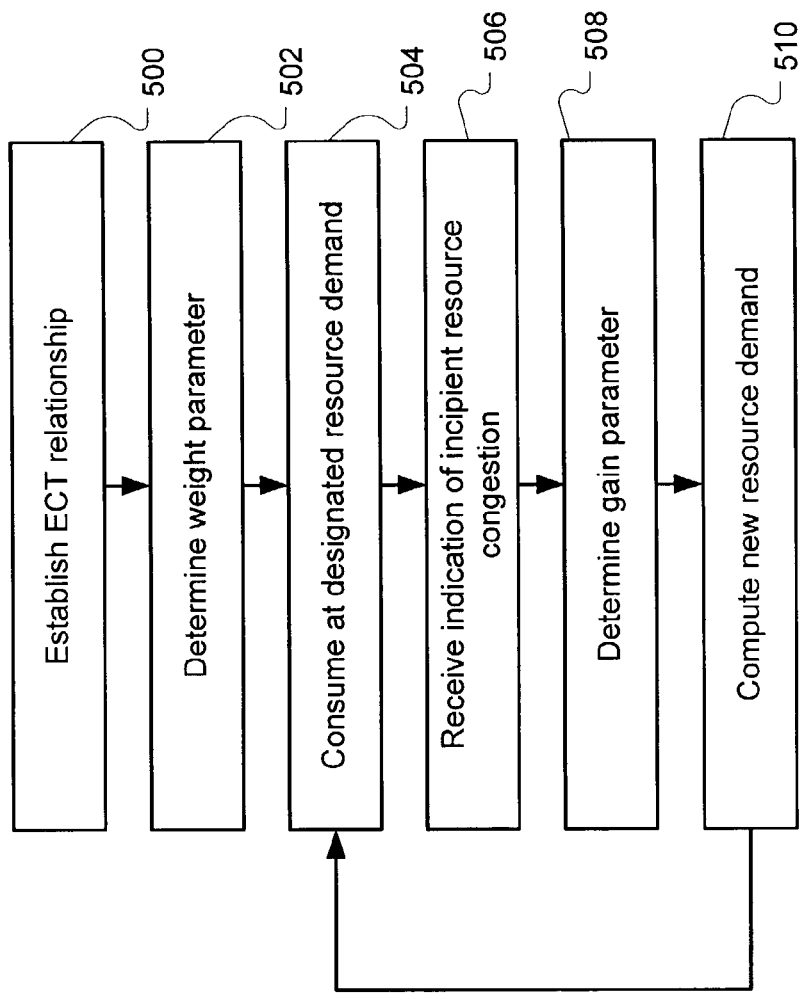
FIG. 5 illustrates operations for reactive bandwidth control in a data streaming environment in an embodiment of the present invention.

FIG. 5 illustrates operations for reactive bandwidth control in a data streaming environment in an embodiment of the present invention. A relationship operation 500 establishes an ECT relationship between a transmitting end system and a receiving end system. In an alternative embodiment, this relationship operation 500 may be completely omitted and the transmitting end system merely assumes that an ECT receiving end system will receive the transmission and report back any incipient congestion issues.

A weight parameter determination operation 502 determines a weight parameter.

A consumption operation 504 consumes an available resource at a designated resource demand (e.g., a transmitter transmits at a designated initial transmission rate). Thereafter, a receiving operation 506 receives an indication of incipient resource congestion, such as a congestion report. A gain parameter determination operation 508 determines a gain parameter. A computation operation 510 computes a new resource demand and applies it to the consumption operation 504.

Figure 6:
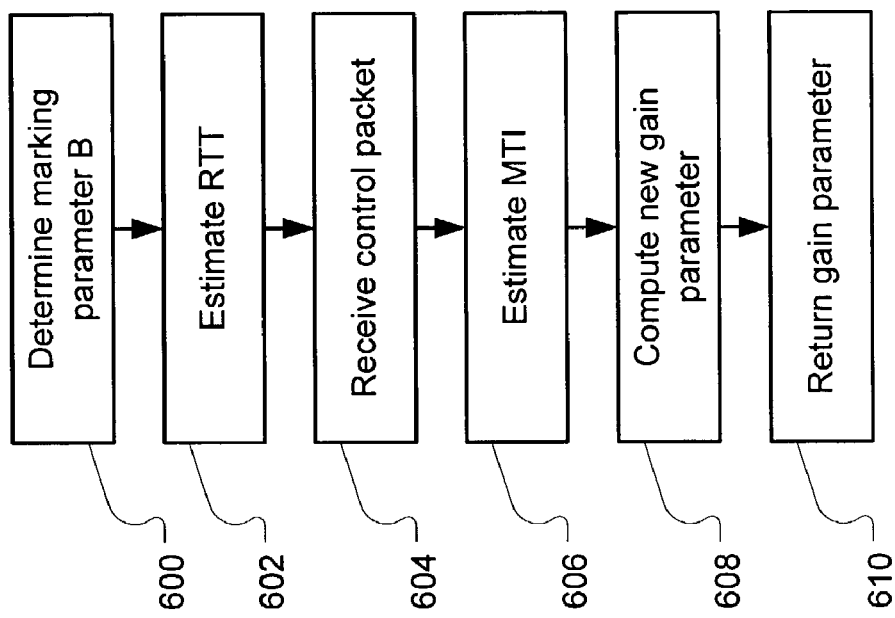
FIG. 6 illustrates operations for setting a gain parameter in an embodiment of the present invention.

FIG. 6 illustrates operations for setting a gain parameter in an embodiment of the present invention. The computation operation 608 receives multiple inputs to compute a new gain factor in response to receipt of a congestion report. A determining operation 600 determines a marking parameter B, representing the number of packets an RTP packet expects to encounter in a queue of an intermediary network device. An estimation operation 602 estimates the RTT (a crude estimate for the RTT is generally acceptable). In one embodiment, the RTT is estimated by the receiver, the sender, or a control-channel specific means, for example using RTCP. In another embodiment, the RTT estimate can be based on the same techniques as used in a TCP RTT estimator, such as where an exponentially weighted moving average is used to combine the current estimate with a previous one. Other methods of estimating RTT may be employed in alternative embodiments of the present invention.

A receiving operation 604 receives a control packet (such as a congestion report). Another estimation operation 606 estimates the measurement time interval (e.g., the time between receptions of two consecutive congestion reports). A computation operation 608 computes a new gain factor, which is returned as a result in return operation 610. An example of an algorithm used to determine the new gain parameter is discussed with regard to FIG. 4, in which the gain parameter k is solved by:

$$k = \text{Min}\left(\frac{1}{B+1}, \frac{MTI}{B*RTT}\right).$$

Figure 7:
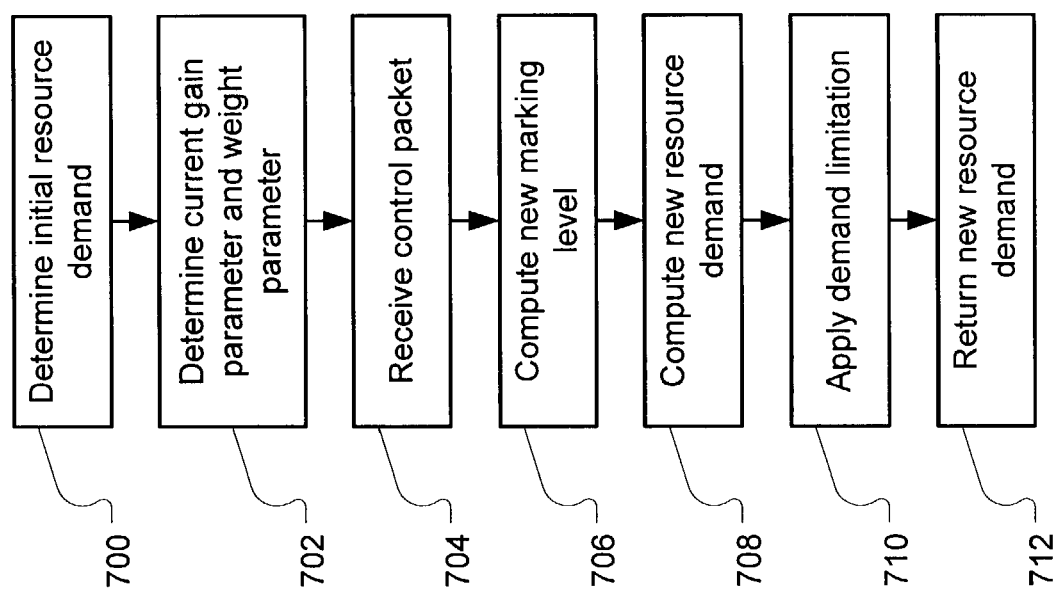
FIG. 7 illustrates operations for updating a transmission rate in an embodiment of the present invention.

FIG. 7 illustrates operations for updating a transmission rate in an embodiment of the present invention. The computation operations 706 and 708 receive multiple inputs to compute a new resource demand in response to receipt of a congestion report. A determining operation 700 determines the initial resource demand (e.g., the initial transmission rate). For example, the transmitting end system may determine the initial transmission rate by accessing a memory location storing the value.

Another determining operation 702 determines the current gain parameter, which may have been computed as described with regard to FIGS. 4 and 6, and a weight parameter, which has been determined by policy or other means, such as by accessing a memory location with a precomputed or stored value. A receiving operation 704 receives a control packet, such as a congestion report, which may includes both the number of marked packets $m_n$ and the number of sent packets $s_n$ during that MTI. Thereafter, the computation operation 706 computes the new marking level $p_n$ (i.e., the new mark probability estimate), based on information in the control packet An example of an algorithm used to determine the new gain parameter is discussed with regard to FIG. 4, in which the new marking level $p_n$ is solved by:

$$p_n = \frac{m_n}{s_n}.$$

The other computation operation 708 computes the new resource demand (e.g., the new transmission rate) $x_{n+1}$. An example of an algorithm used to determine the new gain parameter is discussed with regard to FIG. 4, in which the new resource demand $x_{n+1}$ is solved by:

$$x_{x+1} = x_n + kx_n \left[1 - p_n - p_n \frac{x_n}{w}\right].$$

In a limiting operation 710 of the illustrated embodiment, a resource demand limitation, i.e., $x_{n+1}=\text{Max}(x_{n+1}, x_{min})$, wherein $x_{min}$ represents a present minimal resource demand allowed by the end system. A return operation 712 returns the value $x_{n+1}$ as a new resource demand result.

Figure 8:
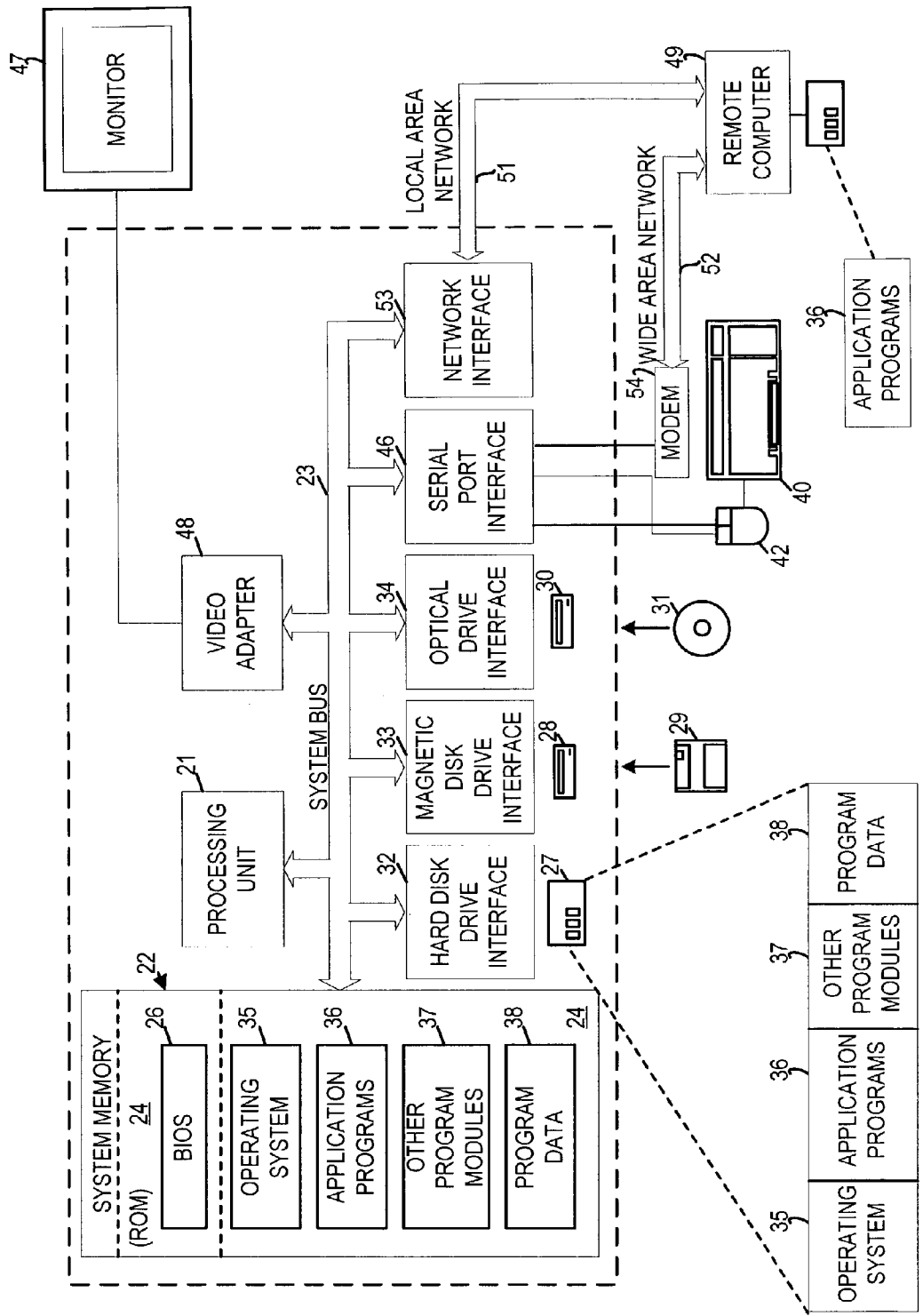
FIG. 8 illustrates an exemplary system useful for implementing an embodiment of the present invention.

The exemplary hardware and operating environment of FIG. 8 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a mark feedback codec, a WTP module, or a marking/mark tracking module may be incorporated as part of the operating system 35, application programs 36, or other program modules 37. The weight parameter, the resource demand values, congestion reports, and packets may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer program product encoding a computer program stored in one or more readable storage media for executing on a computer system a computer process for adjusting a resource demand on an available resource by a resource consumer based on an indication of incipient resource congestion detected by an intermediary device, the computer process comprising:
  determining a weight parameter relating to a fair share of an available resource associated with the resource consumer;
  receiving the indication of incipient resource congestion;
  determining a gain parameter relating to a magnitude of an adjustment in the resource demand by the resource consumer through the intermediary device, based on the indication of the incipient resource congestion, wherein determining the gain parameter (k) comprises computing:

$$k = \text{Min}\left(\frac{1}{B+1}, \frac{MTI}{B*RTT}\right)$$

where B is a number of packets expected in a queue of the intermediary device, MTI (Measurement Time Interval) is a length of time between reception of two consecutive indications of incipient resource congestion, and RTT is a Round Trip Time;
  computing a new resource demand based on the weight parameter and the gain parameter to adjust use by the resource consumer of the available resource; and adjusting use by the resource consumer of the available resource based on the computed demand.

2. The computer program product of claim 1 wherein the operation of determining a weight parameter comprises:
  determining the weight parameter based on a target resource demand associated with the resource consumer.

3. The computer program product of claim 1 wherein the operation of determining a weight parameter comprises:
  determining the weight parameter based on an expected resource demand over a given number of one or more TCP connections.

4. The computer program product of claim 1 wherein the operation of receiving the indication of incipient resource congestion comprises:
  receiving a congestion report.

5. The computer program product of claim 1 wherein the operation of receiving the indication of incipient congestion comprises:
  receiving a count of packets received by a receiving end system during a measurement time interval; and
  receiving a count of marked packets received by a receiving end system during a measurement time interval.

6. The computer program product of claim 1 wherein the operation of determining a gain parameter comprises:
  determining the gain parameter based upon a marking parameter, a round trip time parameter, and a measurement time interval parameter.

7. The computer program product of claim 1 wherein the operation of computing a new resource demand comprises:
  computing the new resource demand based on the gain parameter, the weight parameter, the initial resource demand, and the indication of incipient resource congestion.

8. The computer program product of claim 1 wherein the resource consumer includes a transmitting end system and the resource demand represents a transmission rate of the transmitting end system.

9. The computer program product of claim 1 wherein the new resource demand is dependent on a capability of a receiving end system.

10. The computer program product of claim 1 wherein the computer process further comprises determining an expected mark probability.

11. The computer program product of claim 10 wherein the operation of determining an expected mark probability comprises estimating the expected mark probability based on the indication of incipient resource congestion.

12. The computer program product of claim 1 wherein determining the weight parameter (w) comprises computing:

$$w = x_{target} \frac{p_{expected}}{1 - p_{expected}}$$

where $X_{target}$ is a transmission rate expected by a given number (N) of TCP connections and $p_{expected}$ is an expected mark probability.

13. The computer program product of claim 1 wherein computing the new resource demand ($X_{x+1}$) comprises computing:

$$x_{x+1} = x_n + kx_n\left[1 - p_n - p_n\frac{x_n}{w}\right]$$

where $X_n$ is a resource demand at a measurement time interval n, k is the gain parameter, w is the weight parameter, and $p_n$ is a mark probability estimate at the measurement time interval n.

14. The computer program product of claim 13 wherein a predefined minimal resource demand is used as the new resource demand when the computed new resource demand is less than the predefined minimal resource demand.

15. A method of adjusting a resource demand on an available resource by a resource consumer based on an indication of incipient resource congestion detected by an intermediary device, the method comprising:
  determining a weight parameter relating to a fair share of an available resource associated with the resource consumer, wherein determining the weight parameter (w) comprises computing:

$$w = x_{target} \frac{p_{expected}}{1 - p_{expected}}$$

where $X_{target}$ is a transmission rate expected by a given number (N) of TCP connections and $p_{expected}$ is an expected mark probability;
  receiving the indication of incipient resource congestion;
  determining a gain parameter relating to a magnitude of an adjustment in the resource demand by the resource consumer through the intermediary device, based on the indication of the incipient resource congestion;
  computing a new resource demand based on the weight parameter and the gain parameter to adjust use by the resource consumer of the available resource; and
  adjusting use by the resource consumer of the available resource based on the computed demand.

16. The method of claim 15 wherein the operation of determining a weight parameter comprises:
  determining the weight parameter based on a target resource demand associated with the transmitting end system.

17. The method of claim 15 wherein the operation of determining a weight parameter comprises:
determining the weight parameter based on an expected resource demand over a given number of one or more TCP connections.

18. The method of claim 15 wherein the operation of receiving the indication of incipient resource congestion comprises:
receiving a congestion report.

19. The method of claim 15 wherein the operation of receiving the indication of incipient congestion comprises:
receiving a count of packets received by a receiving end system during a measurement time interval; and
receiving a count of marked packets received by a receiving end system during a measurement time interval.

20. The method of claim 15 wherein the operation of determining a gain parameter comprises:
determining the gain parameter based upon a marking parameter, a round trip time parameter, and a measurement time interval parameter.

21. The method of claim 15 wherein the operation of computing a new resource demand comprises:
computing the new resource demand based on the gain parameter, the weight parameter, the initial resource demand, and the indication of incipient resource congestion.

22. The method of claim 15 wherein the resource consumer includes a transmitting end system and the resource demand represents a transmission rate of the transmitting end system.

23. The method of claim 15 wherein the new resource demand is dependent on a capability of a receiving end system.

24. The method of claim 15 further comprising determining an expected mark probability.

25. The method of claim 24 wherein the operation of determining an expected mark probability comprises estimating the expected mark probability based on the indication of incipient resource congestion.

26. The method of claim 15 wherein determining the gain parameter (k) comprises computing:

$$k = \text{Min}\left(\frac{1}{B+1}, \frac{MTI}{B*RTT}\right)$$

where B is a number of packets expected in a queue of the intermediary device, MTI (Measurement Time Interval) is a length of time between reception of two consecutive indications of incipient resource congestion, and RTT is a Round Trip Time.

27. An end system for providing reactive bandwidth control to adjust a resource demand on an available resource by a resource consumer based on an indication of incipient resource congestion detected by an intermediary device, the end system comprising:
a network transport layer module receiving the indication of incipient resource congestion;
a WTP module:
determining a weight parameter relating to a fair share of an available resource associated with the resource consumer,
determining a gain parameter relating to a magnitude of an adjustment in the resource demand by the resource consumer through the intermediary device, based on the indication of the incipient resource congestion,
computing a new resource demand based on the weight parameter and the gain parameter to adjust use by the resource consumer of the available resource, and
adjusting use by the resource consumer of the available resource based on the computed demand, wherein computing the new resource.

$$x_{x+1} = x_n + kx_n\left[1 - p_n - p_n\frac{x_n}{w}\right]$$

where $x_n$ is a resource demand at a measurement time interval n, k is the gain parameter, w is the weight parameter, and $p_n$ is a mark probability estimate at the measurement time interval n.

28. The end system of claim 27 further comprising:
a media controller applying the new resource demand in the resource consumer.

29. The end system of claim 27 further comprising:
a marking module marking outgoing IP packets as explicit congestion notification capable.

30. The end system of claim 27 wherein determining the gain parameter (k) comprises computing:

$$k = \text{Min}\left(\frac{1}{B+1}, \frac{MTI}{B*RTT}\right)$$

where B is a number of packets expected in a queue of the intermediary device, MTI (Measurement Time Interval) is a length of time between reception of two consecutive indications of incipient resource congestion, and RTT is a Round Trip Time.

* * * * *